US009443479B2

(12) United States Patent
Fergason et al.

(10) Patent No.: US 9,443,479 B2
(45) Date of Patent: *Sep. 13, 2016

(54) IMAGE ACQUISITION AND DISPLAY SYSTEM AND METHOD USING INFORMATION DERIVED FROM AN AREA OF INTEREST IN A VIDEO IMAGE IMPLEMENTING SYSTEM SYNCHRONIZED BRIGHTNESS CONTROL AND USE OF METADATA

(71) Applicant: Fergason Patent Properties LLC, Portola Valley, CA (US)

(72) Inventors: James L. Fergason, Menlo Park, CA (US); John D. Fergason, Los Altos, CA (US)

(73) Assignee: Fergason Licensing LLC, Portola Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,482

(22) Filed: Feb. 13, 2015

(65) Prior Publication Data

US 2015/0161953 A1 Jun. 11, 2015

Related U.S. Application Data

(63) Continuation of application No. 12/525,098, filed as application No. PCT/US2008/052521 on Jan. 30, 2008, now Pat. No. 8,982,146.

(60) Provisional application No. 60/945,667, filed on Jun. 22, 2007, provisional application No. 60/887,346, filed on Jan. 30, 2007.

(51) Int. Cl.
*G09G 3/34* (2006.01)
*H04N 21/235* (2011.01)
(Continued)

(52) U.S. Cl.
CPC ............ *G09G 3/3413* (2013.01); *G09G 3/3611* (2013.01); *H04N 5/20* (2013.01);
(Continued)

(58) Field of Classification Search
None
See application file for complete search history.

(56) References Cited

U.S. PATENT DOCUMENTS 5,542,003 A 7/1996 Wofford
6,282,317 B1 8/2001 Luo et al.
(Continued)

FOREIGN PATENT DOCUMENTS

| EP | 0 730 371 | 9/1996 |
| JP | 2006-195651 | 7/2006 |
| JP | 2002-099250 | 4/2010 |

OTHER PUBLICATIONS

Linda Shapiro and George Stockman, Computer Vision Textbook, 2000, Chapter 5: Filtering and Enhancing Images, retrieved from <<https://courses.cs.washington.edu/courses/cse576/99sp/book.html>> accessed Sep. 8, 2015.*
(Continued)

*Primary Examiner* — Michael J Cobb
(74) *Attorney, Agent, or Firm* — Vedder Price P.C.; Rebecca G. Rudich

(57) ABSTRACT

Method and apparatus for preparing and displaying images uses image characteristics of an area of interest of images to optimize or otherwise determine image characteristics of the entire image to be displayed. The area of interest information may be used in computing a System Synchronized Backlight Control ("SSBC") profile tor the area of interest, and the SSBC profile may be used to adjust the image signal to provide an image in which the image characteristics, e.g., are optimized for the image at the area of interest. The image characteristics and/or SSBC profile information may be provided as metadata included in a video signal data stream. The area of interest may be selected where the image is obtained, where the image is shown or elsewhere, e.g., in an image storage device, image player, etc.

14 Claims, 8 Drawing Sheets

TYPICAL SSBC VIDEO FLOW CHART

(51) Int. Cl.
  *H04N 5/20* (2006.01)
  *G09G 3/36* (2006.01)
  *H04N 21/435* (2011.01)

(52) U.S. Cl.
  CPC ......... *H04N 21/235* (2013.01); *H04N 21/435* (2013.01); *G09G 3/3406* (2013.01); *G09G 2320/0233* (2013.01); *G09G 2320/0242* (2013.01); *G09G 2320/0271* (2013.01); *G09G 2320/0646* (2013.01); *G09G 2360/16* (2013.01); *G09G 2370/04* (2013.01)

(56) References Cited

U.S. PATENT DOCUMENTS

| | | |
|---|---|---|
| 6,985,172 B1 | 1/2006 | Rigney et al. |
| 7,053,953 B2 | 5/2006 | Belz et al. |
| 2003/0033384 A1 | 2/2003 | Nishizawa et al. |
| 2003/0118245 A1 | 6/2003 | Yaroslavsky et al. |
| 2003/0146997 A1 | 8/2003 | Fredlund et al. |
| 2004/0041813 A1 | 3/2004 | Kim |
| 2005/0078878 A1 | 4/2005 | Kuo et al. |
| 2005/0100242 A1 | 5/2005 | Trifonov et al. |
| 2005/0128312 A1 | 6/2005 | Fredlund et al. |
| 2005/0134719 A1 | 6/2005 | Beck |
| 2005/0220348 A1 | 10/2005 | Chiu et al. |
| 2006/0088210 A1 | 4/2006 | Yu et al. |
| 2006/0152619 A1 | 7/2006 | Takei |
| 2006/0204054 A1 | 9/2006 | Steinberg et al. |
| 2007/0027844 A1 | 2/2007 | Toub et al. |
| 2007/0136742 A1 | 6/2007 | Sparrell |
| 2007/0183662 A1 | 8/2007 | Wang et al. |
| 2007/0189627 A1 | 8/2007 | Cohen et al. |
| 2007/0189713 A1 | 8/2007 | Choi et al. |
| 2008/0090610 A1 | 4/2008 | Wang et al. |
| 2008/0137984 A1* | 6/2008 | Lou .................. G06T 5/009 382/273 |
| 2008/0219529 A1 | 9/2008 | Alexandrov et al. |
| 2009/0002563 A1 | 1/2009 | Barnhoefer et al. |
| 2009/0109233 A1 | 4/2009 | Kerofsky et al. |

OTHER PUBLICATIONS

Neel Joshi, Wojciech Matusik, Edward H. Adelson, Mit Scail, David J. Kriegman, Personal Photo Enhancement Using Example Images, 2010, ACM Transactions on Graphics, 29(2):Article 12, pp. 1-15.*
D. Nagesh Kumar, Digital Image Processing for Image Enhancement and Information Extraction, 1997, Proceedings of Workshop on Remote Sensing and GIS Applications in Water Resources Engineering, retrieved from <<http://civil.iisc.ernet.in/~nagesh/rs_docs/Imagef.pdf>> accessed Sep. 8, 2015.*
Pierre de Greef, Hendrick G. Hulze, 39.1: Adaptive Dimming and Boosting Backlight for LCD-TV Systems, May 2007, SID Symposium Digest of Technical Papers, 38(1):1332-1335.*
Pierre de Greef and Hendriek G. Hulze, Adaptive dimming and adaptive boosting backlight technologies for LCD-TV systems, Nov. 2007, EE Times-India, pp. 1-4.*
Neel Joshi, Wojciech Matusik, Edward H. Adelson, David J. Kriegman, Personal Photo Enhancement Using Example Images, 2010, ACM Transactions on Graphics (TOG), vol. 29, Issue 2, Article No. 12, pp. 1-15.*
Fergason Patent Properties, System Synchronized Brightness Control (SSBC): Dramatically Improving LCD and Projection Images, 2006, Fergason Patent Properties . . . .
Nachyuck Chang et al., DLS: Dynamic Backlight Luminance Scalig of Liquid Crystal Display 2004, IEEE Transactions on Very Large Scale Integration (VLSI) Systems, 12(8):837-846.
Ki-Duk Kim et al., Adaptive Dynamic Image Control for IPS-Mode LCD TV 2004, Society for Information Display Symposium Digest of Technical Papers, 35(1):1548-1549.
Ali Iranli et al., HEBS: Histogram Equalization for Backlight Security Scaling, 2005, Proceedings of the Conference on Design, Automation and Test in Europe, p. 346-351.
Ali Iranli et al., HEBS: Histogram Equalizataion for Backlight Security Scaling (Presentation), 2005, Proceedings of the Conference on Design, Automation and Test in Europe.
Eui Yeol Oh et al., IPS-Mode Dynamic LCD-TV Realization with Low Black Luminance and High Contrast by Adaptive Dynamic Image Control Technology, 2005, Journal of the . . . .
Insun Hwang et al., Image Synchronized Brightness Control, 2001, Society for Information Display Symposium Digest of Technical Papers, 32(1):492-493.
Hojun Shim et al., Power Saving in Hand-Held Multimedia Using MPEG-21 Digistal Item Adaptation, 2004, 2nd Workshop on Embedded Systems for Real-Time Multimedia, p. 13-18.
Cassandra Swain et al., Defocus-Based Image Segmentation, 1995, International Conference on Acoutstics, Speech and Signal Processing, vol. 4, p. 2403-2406.
ERDAS, ERDAS Imagine Tour Guide: ERDAS Imagine v8.4; 1999, ERDAS Inc., Chapter 1.
ITC-ILWIS, ILWIS 3.0 Academic User's Guide, 2001, Unit Geo Software Development Sector Sensing and GIS IT Department International Institute for Aerospace Survey . . . .
Nalliah Raman et al., Content Based Contrast Enhancement for Liquid Crystal Displays with Backlight Modulation, 2005, IEEE Transactions on Consumer Electronics, 51 (1):18-21.
Yeong-Kang Lai et al., Content-Based LCD Backlight Power Reduction with Image Contrast Enhancement Using Histogram Analysis. 2011, Journal of Display Technoiogy, 7(10):550-555.
Huajun J. Penh et al., 39.2: High Contrast LCD TV Using Active Dynamic LED Backlight, 2007, SID Symposium Digest of Technical Papers 2007, 38(1):1336-1338.
Chih-Chang Lai et al., Backlight Power Reduction and Image Contrast Enhancement Using Adaptive Dimming for Global Backlight Applications, 2008, IEEE Transactions on . . . .
Pierre de Greef et al., 39:1 Adaptive Dimming and Adaptive Boosting Backlight Technologies for LCD-TV Systems, 2007, SID Symposium Diciest of Technical Papers 2007 . . . .

* cited by examiner

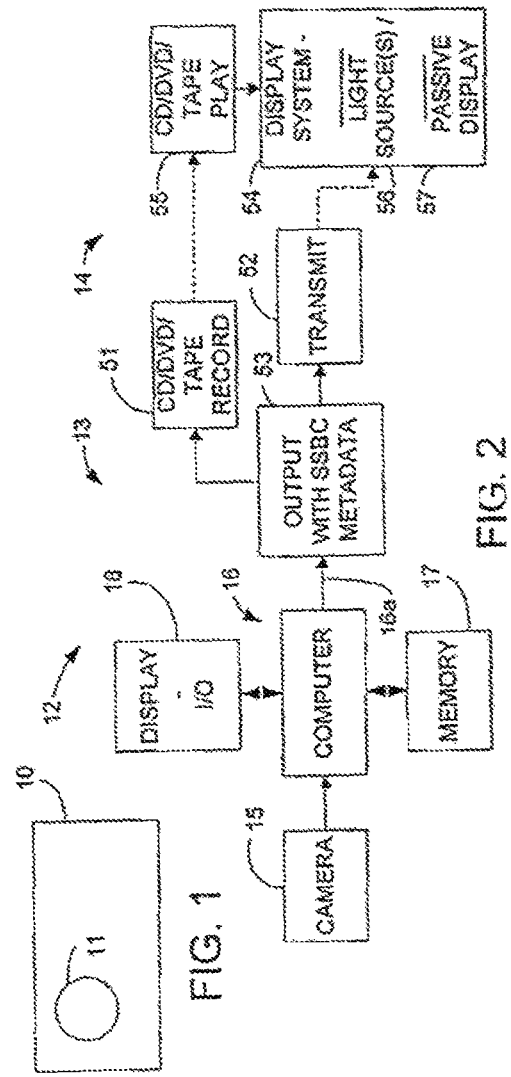

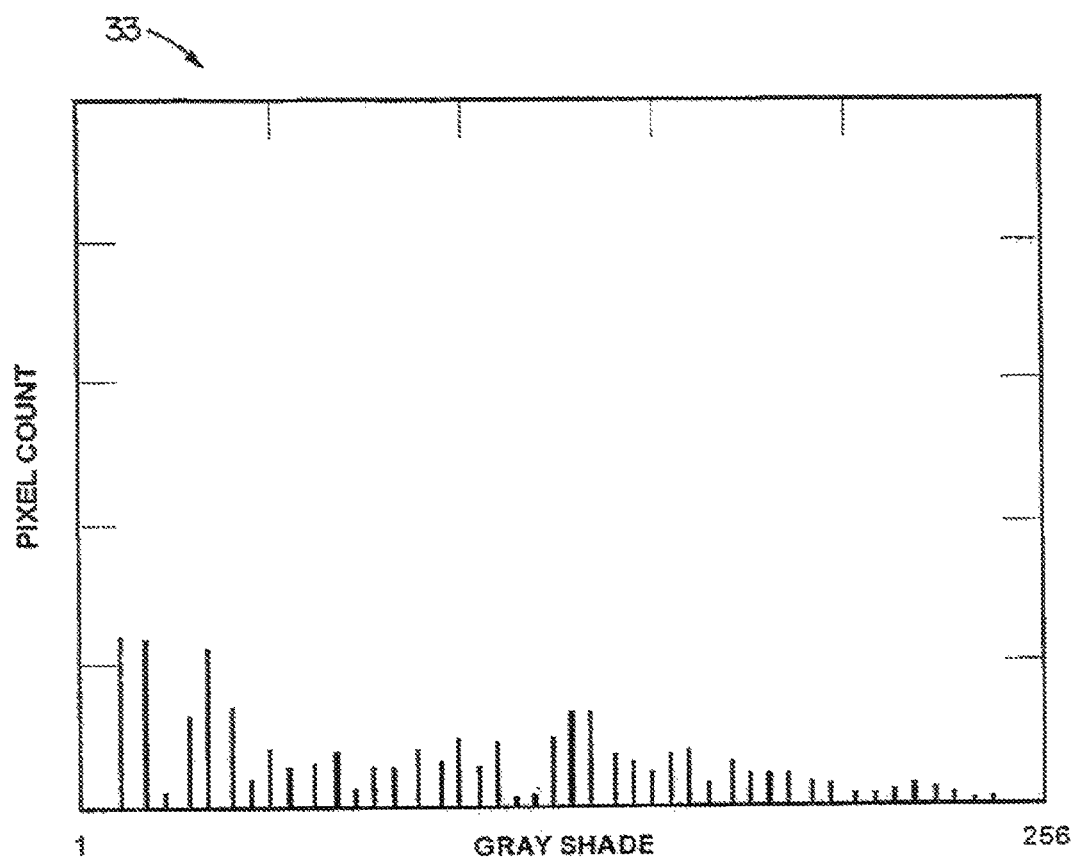
FIGURE 3: HISTOGRAM OF A NORMAL IMAGE

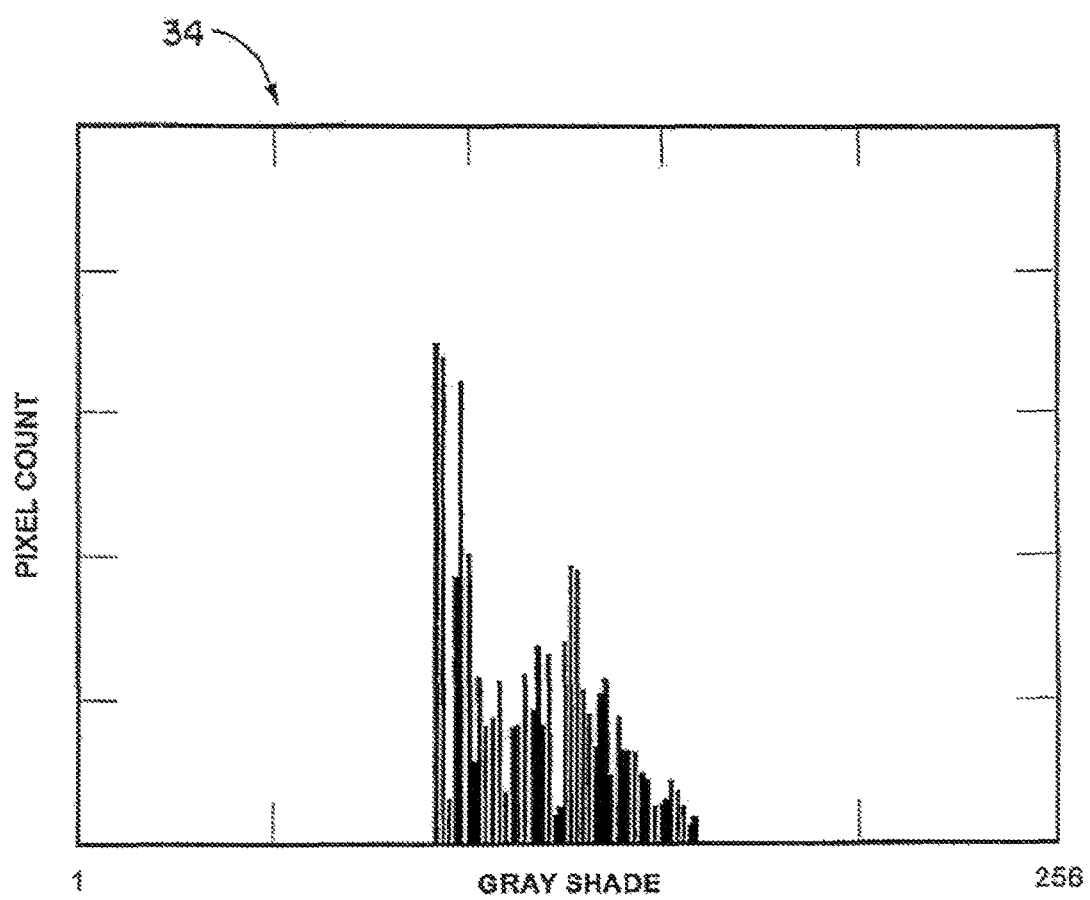

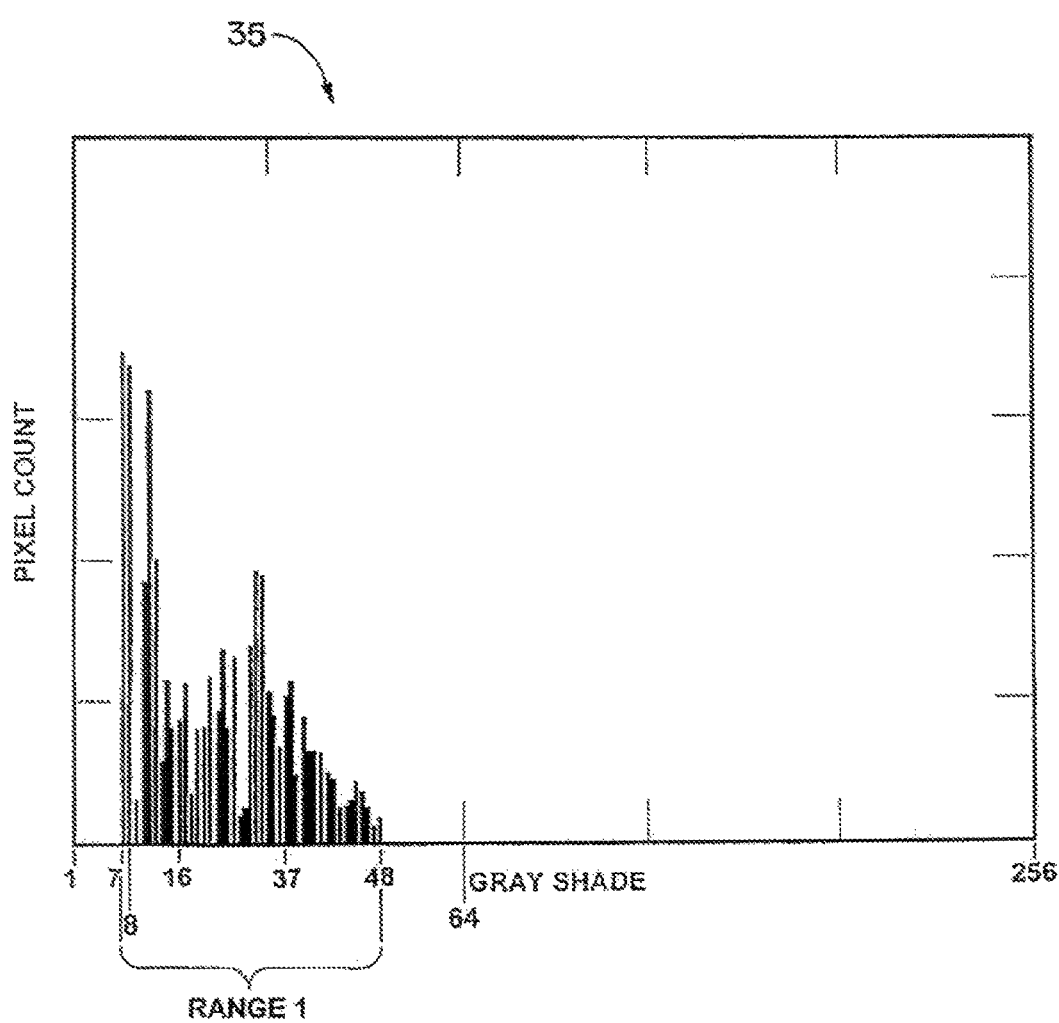

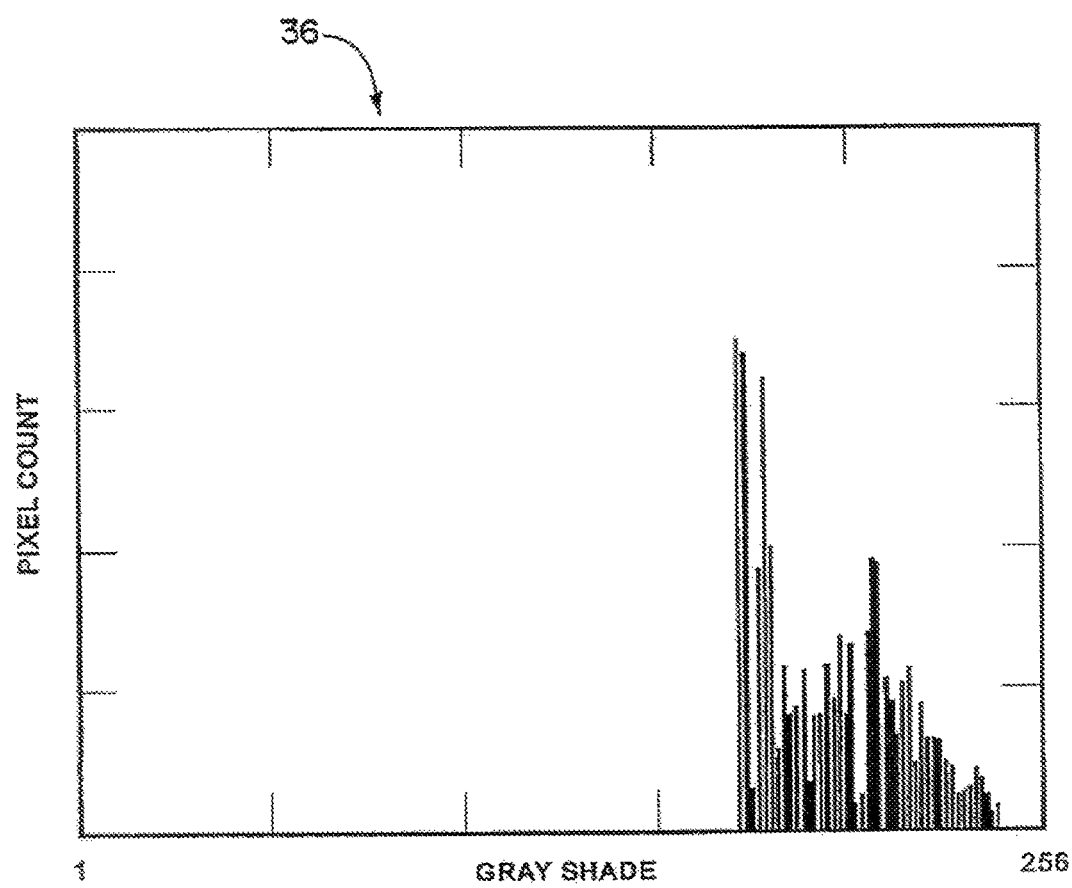

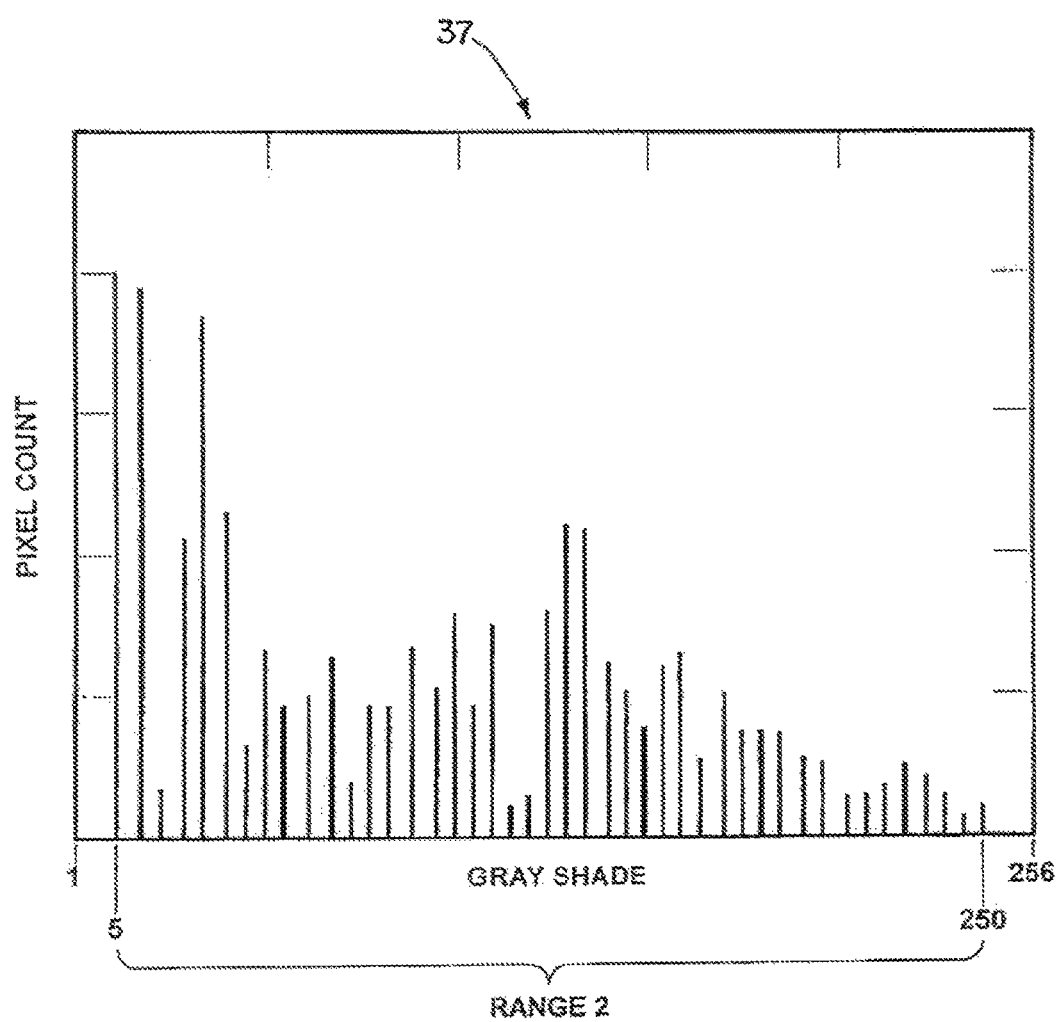

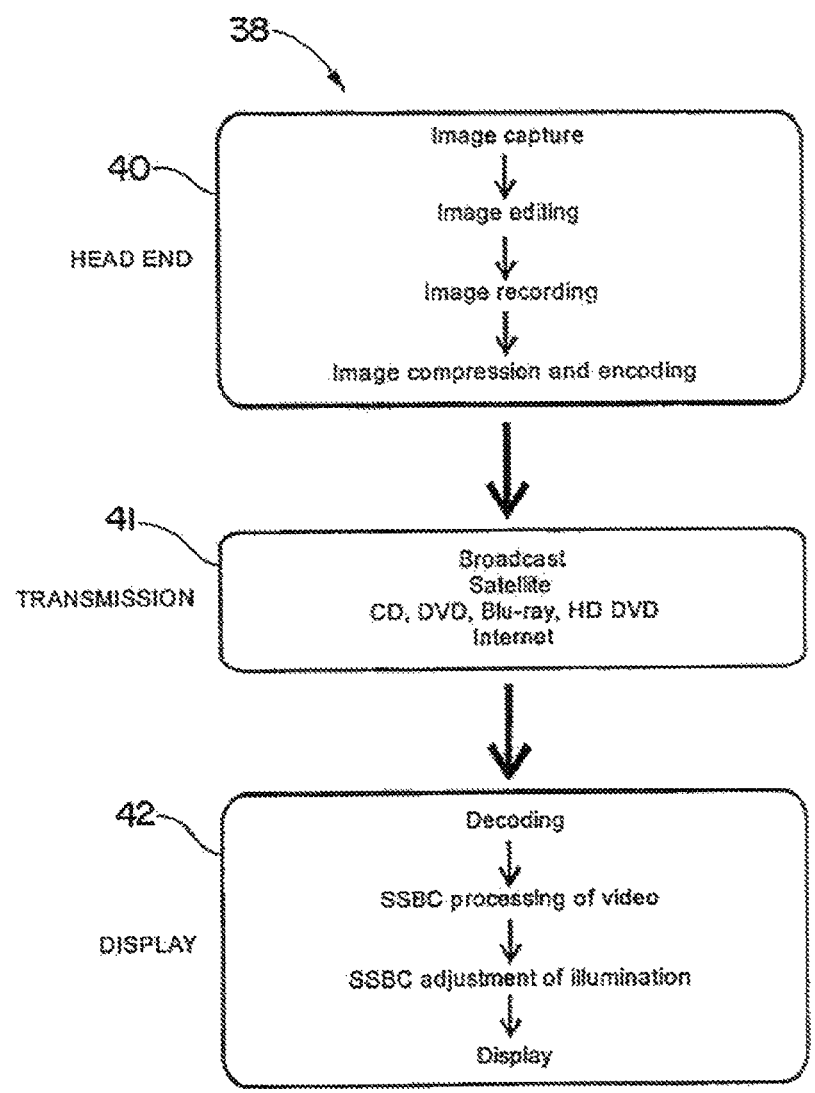
FIGURE 8: TYPICAL SSBC VIDEO FLOW CHART

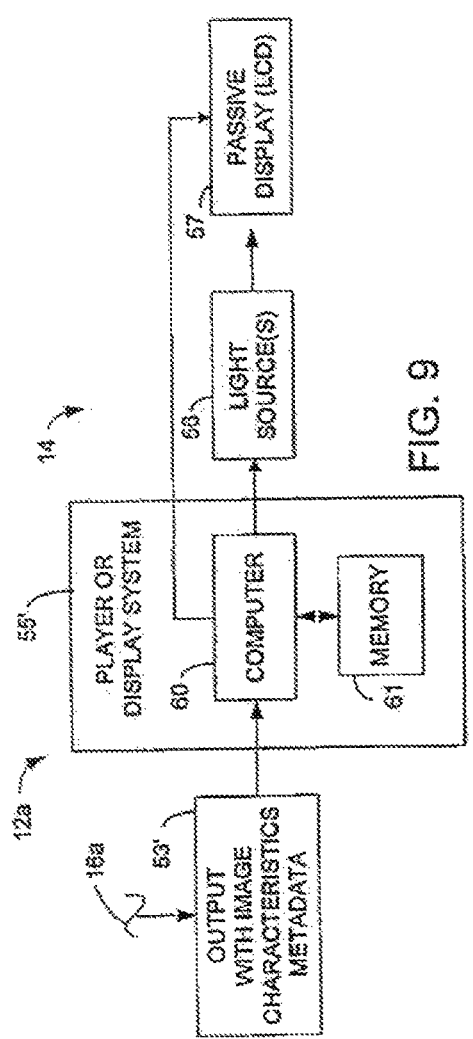
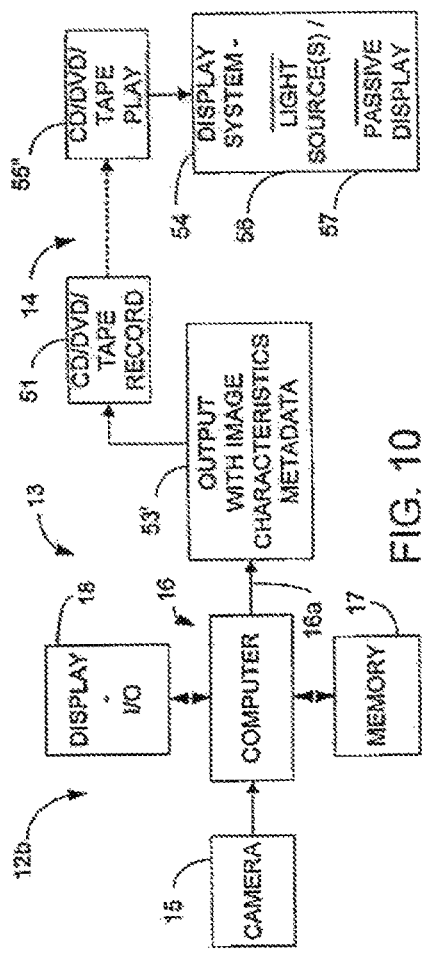
FIG. 9
FIG. 10

IMAGE ACQUISITION AND DISPLAY SYSTEM AND METHOD USING INFORMATION DERIVED FROM AN AREA OF INTEREST IN A VIDEO IMAGE IMPLEMENTING SYSTEM SYNCHRONIZED BRIGHTNESS CONTROL AND USE OF METADATA

CROSS-REFERENCE TO RELATED APPLICATIONS

The instant APPLICATION is a continuation of U.S. patent application Ser. No. 12/525,098, filed May 21, 2010, now allowed, which is the National Stage of International Application No. PCT/US08/52521 filed Jan. 30, 2008, now published as WO 2008/095037, publication date Aug. 1, 2008, which claims benefit of Provisional Application No. 60/945,667 filed Jun. 22, 2007 and Provisional Application No. 60/887,346 filed Jan. 30, 2007. All of the above-mentioned patent applications are incorporated herein by reference in their entirety as if fully set forth herein.

TECHNICAL FIELD

The invention relates generally, as indicated to image acquisition and display systems and methods utilizing information from an area of interest and, more particularly, to an image acquisition and display system and method using metadata derived from an area of interest in a video image to implement system synchronized brightness control

BACKGROUND

One type of display system, for example, a video display system or other display system, configuration consists of an illumination source (sometimes referred to as light source) and a pixilated, passive display. The image is created by modulating the intensity of light emitted from the illumination source simultaneous with transmission through the display on a pixel by pixel basis. An example of such a display system is that based on the Liquid Crystal Display (sometimes referred to as LCD). System Synchronized Brightness Control (sometimes referred to as SSBC) (as well as variants on this approach) is a means of simultaneously adjusting the backlight brightness and the gray levels of the LCD pixels in real time based on the content of the input image. As one example using an SSBC approach in connection with preparing a video signal for displaying on a display, the video signal may be adjusted, e.g., to stretch gray scale, to alter the intensity of the light illuminating the display, etc. A purpose for these adjustments is to increase the inter frame contrast ratio, called the dynamic contrast, and to enhance the details and the visibility of details as well as to reduce contouring in bright or dark areas of the image. Examples of SSBC apparatus and methods are disclosed, for example, in U.S. Pat. No. 5,717,422, issued Feb. 10, 1998, U.S. Pat. No. 6,816,141 B1 issued Nov. 9, 2004, and copending U.S. patent application Ser. No. 10/983,403, filed Nov. 8, 2004, the entire disclosures of which are incorporated by this reference.

SUMMARY

Briefly, according to an aspect of the invention, an area of interest in an image is defined, and information pertaining to such area of interest is used to determine characteristics of the image for display.

According to another aspect, the area of interest in an image is used largely or exclusively for SSBC calculation, and the SSBC adjustments may be implemented at the display or at the display end of a display system. The definition of area of interest may be made through creative input of people or automatically through the use of an algorithm.

According to another aspect, the video imagery and the SSBC adjustments are encoded in the video stream, According to another aspect, the video imagery and the SSBC adjustments are encoded in the video stream as metadata.

According to another aspect, the video imagery and the SSBC adjustments are encoded in the video stream as metadata separate from the video imagery.

According to another aspect, the video imagery and the definition of the area of interest, e.g., as determined by creative input of people, by automatic implementation of an algorithm or by some other means, are transmitted in the video stream, and the SSBC calculation is performed at the display or display end of a display system based largely or even exclusively on the content of the area of interest. The SSBC adjustments are implemented at the display end.

According to another aspect, the rules for identifying an area of interest are included as an algorithm in the hardware at the display or display end of a display system, and the SSBC calculations are performed at the display or display end based largely or even exclusively on the content of the area of interest; and the SSBC adjustments are implemented at the display or display end.

According to another aspect, the information pertaining to an area of interest is used to calculate an SSBC "profile" of the image at the source of the image. The source of the image is at the place and/or equipment where the image is obtained or initially is created or is adjusted, as contrasted to the place and/or equipment, such as a display, projector or the like, where or by which the image is presented for viewing, e.g., by a display, projector or the like.

According to an aspect of the invention, an area of interest in an image is defined, and the SSBC "profile" of an image frame based on this area is calculated at the source of the image.

According to another aspect, the SSBC "profile" information calculated at the source of the image is transmitted as metadata encoded into the input image.

According to another aspect, a receiving device decodes and uses the metadata as the basis of means to implement the desired SSBC adjustments.

According to another aspect a receiving device, for example, a display system, decodes and uses the metadata as the basis of means to implement the desired SSBC adjustments.

According to another aspect, a receiving device, for example, a player device, decodes and uses the metadata to implement the desired SSBC adjustments in the signal(s) provided a display to present an image.

According to another aspect, the information pertaining to such area of interest of an image is provided as metadata with the video signal or other signal representing the image and such metadata is used as the basis of means to implement desired SSBC adjustments.

According to another aspect, a receiving device, for example, a display system, decodes and uses the metadata that represents information pertaining to an area of interest of an image as the basis of means to implement the desired SSBC adjustments.

According to another aspect, a receiving device, for example, a player device, decodes and uses the metadata that represents information pertaining to an area of interest of an image to implement the desired SSBC adjustments in the signal(s) provided a display to present an image.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. Likewise, elements and features depicted in one drawing or embodiment of the invention may be combined with elements and features depicted in one or more additional drawings or embodiments. Moreover, in the drawings, like reference numerals designate corresponding parts throughout the several views.

BRIEF DESCRIPTION OF THE DRAWINGS

In the annexed drawings:

FIG. 1 is a schematic illustration of an image or scene with an area of interest;

FIG. 2 is schematic block diagram of an image acquisition and display system;

FIG. 3 is a graphical representation of a histogram of an exemplary normal image showing 256 possible shades of gray and pixel counts for the respective shades of gray;

FIG. 4 is a graphical representation of a histogram of an exemplary low contrast image;

FIG. 5 is a graphical representation of a histogram of an exemplary dim or relatively dark image;

FIG. 6 is a graphical representation of a histogram of an exemplary relatively bright image;

FIG. 7 is a graphical representation of a histogram of an SSBC adjusted dim image;

FIG. 8 is a schematic flow chart illustrating a method in accordance with an embodiment of the invention;

FIG. 9 is a schematic block diagram of a portion of an image acquisition and display system in accordance with an embodiment of the invention wherein metadata pertaining to characteristics of an area of interest of an image (or the image itself) is provided the receiver device, e.g., display, which does an SSBC computation and adjusts the light source and gray levels accordingly; and FIG. 10 is a schematic block diagram of an image acquisition and display system in accordance with an embodiment of the invention in which a video player or the like does the SSBC computation and the display system adjusts the light source and gray levels accordingly without additional computation.

DESCRIPTION

Initially referring to FIG. 1, an image 10 is illustrated in a rectangular form. The image may be the view as seen through a camera lens, a view as received by film in a film camera, a digital image as sensed by a digital camera, etc. The image 10 as it is shown in FIG. 1 may actually be a real life scene prior to being picked up or sensed by a camera or the like. An area of interest 11 is in the image 10. For example, if the image 10 portrays a person and other background, the area of interest 11 may be the face of the person or the entire body of the person, an airplane in a cloudy sky, a flower in a garden, etc. The area of interest 11 may he, for example, the place in the image 10 where a movie director or editor wants a viewer to focus attention in the overall image. The area of interest may be the entire image 10, e.g., the full screen image, or it may be a portion less than the entire image.

Several exemplary embodiments of the invention are described in greater detail below. Area of interest information, e.g., image characteristics of the area of interest, may be used to determine, e.g., to compute, an SSBC profile for the image. The area of interest may be selected in several ways, e.g., as are described herein, and at different respective parts of a system, e.g., where the image is obtained, where the image is prepared for displaying, e.g., at a CD, DVD, tape, etc. player, at the display, etc., as are described herein. The SSBC profile may be prepared, e.g., computed, calculated, etc., at different respective parts of a system, e.g., where the image is obtained, where the Image is prepared for displaying, at the display, etc., as are described herein, information pertaining to area of interest and/or SSBC profile may be provided in a video stream, e.g., as metadata, for use where the image is prepared for displaying, at the display, etc.

As is described farther below, the area of interest 11 may be selected by a person who is photographing the image 10 by making appropriate adjustments on the camera or other equipment used to pick up or to sense the image so as to identify a specified part or all of the image as the area of interest. Alternatively, the area of interest 11 may be selected during editing of the image 10 by a person using a computer or other editing equipment; for example, the area of interest may be highlighted, bounded by boundary lines or shapes, or otherwise selected by appropriate editing software or the like. The area of interest 11 may be selected automatically by software that is programmed to select an area of interest according to specified criteria, for example. For convenience the image 10 also may be referred to below as an input image, e.g., a video signal, computer graphics signal, or some other representation of the image 10. The input image may be provided by a camera, by animation, or by some other source, e.g., a storage medium, such as a CD, DVD, tape, solid state memory, etc.

Turning to FIG. 2, an image acquisition and display system 12 is illustrated schematically in block diagram form. For convenience the system 12 will be referred to as including an image source portion or image source 13 and an Image output portion or receiving device 14. The image output portion or receiving device 14 (sometimes referred to below as "receiving device" or as "output portion") may be, for example, a display, such as, for example, a passive display or other display. As examples, the image source portion 13 may be that part of the display system at which an image is obtained; the receiving device or output portion maybe a display on which an image is shown and/or may be a device that prepares an image to be shown on a display, such as, for example, a CD, DVD, blue ray (sometimes referred to as "Blu-Ray" or the like) or tape player, etc.

In an embodiment of the invention at the image source portion 13 an area of interest 11 in the image 10 is defined, the SSBC profile of an image frame is calculated based on such area of interest, and the SSBC information is transmitted as metadata encoded into the input image. In an embodiment of the invention the receiving device 14 decodes and uses the metadata as the basis of implementing the desired SSBC adjustments. This approach may provide one or more advantages. For example, it may ensure proper calculation and encoding of the desired adjustments into the input image. Also, it may reduce system cost by moving the burden of SSBC calculation and encoding and the associated expense of the hardware required to enable such calculation to the source, e.g., the image source portion 13, where it can be done once for each source image, thus not requiring it to be done at each and every individual display. Further, it may facilitate providing image adjustment based on area of interest characteristics. A simple metadata decoding process in each display will assure the proper display of the image. The SSBC technique can be applied to displays that are made up of independent illumination and image sources.

In accordance with embodiments of the invention SSBC data or information and information or rules of selection with regard to area of interest may he provided as metadata or may be otherwise provided. Examples that may use, but do not necessitate use of, metadata are, as follows:

The area of interest in an image may he used largely or exclusively for SSBC calculation, and the SSBC; adjustments may be implemented at the display or at the display end (also referred to as the output portion) of a display system. The definition of area of interest may be made through creative input of people or automatically through the use of an algorithm.

The video imagery and the SSBC adjustments are encoded in the video stream.

The video imagery and the definition of the area of interest, e.g., as determined by creative input of people, by automatic implementation of an algorithm or by some other means, may be transmitted in the video stream, and the SSBC calculation may be performed at the display or display end of a display system based largely or even exclusively on the content of the area of interest. The SSBC adjustments are implemented at the display end.

The rules for identifying an area of interest may be included as an algorithm in the hardware at the display or display end of a display system, and the SSBC calculations may be performed at the display or display end based largely or even exclusively on the content of the area of interest; and the SSBC adjustments are implemented at the display or display end.

As is described in an embodiment of the invention, the area of interest within an image and the image characteristics or feature(s) of the area of interest may be used as the basis upon which SSBC adjustments are computed. The area of interest can be defined in several ways, several examples of which are, as follows:

The in-focus portion of the image: An image can be created having a narrow depth of field, in such an image, the area of interest is in sharp focus while other portions of the image, e.g., those either closer to or further from the viewer, are out of focus.

Faces: If a face occupies a large percentage of an image, it is likely the area of interest. Various face recognition software programs and algorithms are available, for example, to recognize either that an image or a portion of an image is a face or that not only is the image a face, but the face is a particular face belonging to a specific individual.

Still object moving against a moving background: As an example, consider a close up image of a passenger in a moving vehicle. The passenger's image is relatively stationary against the moving background of the scene outside the vehicle; the stationary object is the area of interest.

Moving object against a still background: Consider a horse and rider moving across a field; the moving object is the area of interest.

Bright area in an otherwise poorly lit image: Consider a singer standing in a spotlight on an otherwise dark stage; the illuminated portion of the image is the area of interest.

Colorful area in an otherwise uncolorful image: Consider several bright or multi-colored balloons floating across an overcast sky; the colorful area is the area of interest.

In another embodiment of the invention at the image source portion 13 an area of interest 11 in the image 10 is defined, and information pertaining to characteristics of the area of interest, e.g., one or more of contrast, brightness, colors, etc., is transmitted as metadata encoded into the signal representing the input image and is provided the output portion 14, e.g., a display, a player that provides signals to be shown on or projected by a display, etc., and at the output portion the metadata may be decoded and appropriate SSBC computation may be carried out. For example, the signal representing the input signal may be a video signal, and the metadata may be combined with the video signal. The computation carried out at the output portion 14 to obtain the desired SSBC profile to provide SSBC adjustment need not be as complex and time consuming as would be the case if the entire SSBC effort were carried out at the output portion, e.g., determining contrast, brightness and colors and also performing the computation.

In the two embodiments mentioned just above, the advantages of the SSBC features may he effectively used in connection with displayed or projected images or with images that are otherwise provided or used. Also, image adjustment conveniently may be carried out based on characteristics of an area of interest, which may enhance the overall image and/or also may help to focus or to direct the attention of a viewer, for example, to the area of interest, e.g., as the image is displayed, projected or otherwise shown or provided to a person viewing the image. Further, the area of interest may be selected by the photographer, editor, etc, before the image, e.g., the video signal with the metadata, is provided the output portion 14.

The image source portion 13 may include a camera 15 that picks up or senses an image or may include some other source of images, e.g., animated images or other image representations, e.g., computer graphics signals or virtually any other source of images. The image source portion also includes a computing or calculating device 16, such as, for example, a computer, e.g., a processor, a personal computer, or other computer, possibly including associated peripheral and/or internal parts, such as, for example, a memory 17, display and input/output equipment 18, e.g., keyboard, display, mouse, trackball, and/or joystick, etc. The computer 16, memory 17, and display and input/output equipment 18 may be used to select, for example, manually (e.g., by an operator of the equipment) or automatically, an area of interest 11 of an input image 10, to compute an SSBC profile for the area of interest, and to provide the SSBC profile or information or to provide information pertaining to characteristics of the area of interest (e.g., one or more of contrast, brightness, colors, etc.) as metadata in a signal, e.g., a video signal, that is to be provided the image output portion 14. A person of ordinary skill in the art may write appropriate computer program software, code or the like in an appropriate language to carry out the steps and functions disclosed herein. Various other parts of the system 12 also may include a processor or the like to carry out the various functions described herein, e.g., to determine area of interest, to determine image characteristics of the area of interest, and/or to compute an SSBC profile based on Image characteristics of the area of interest, as are described elsewhere herein.

The content of the "captured image," that is, the as recorded video image, for example, may be analyzed. As an example, the means used to make this analysis are histograms of the image content in which the "GRAY SHADE" of the pixels is plotted against the "PIXEL COUNT" or number of pixels in the display having that gray shade value. In the examples described with respect to FIGS. 3-7, the gray shades range from shade 1 at the dark extreme to shade 256 at the bright extreme.

FIG. 3 is a histogram 33 in which the captured image is "normal" which in the context of the example presented herein means an image in which the pixel brightness extends more or less uniformly over the entire range of available gray shades, in FIGS. 3-7 the shades of gray are shown along the X-axis (horizontal axis of the illustrated graphs or charts) and the number of pixels having a given shade of gray is plotted on the Y-axis (vertical axis of the illustrated graphs or charts). FIG. 4 is a histogram 34 of a low contrast image. Note that only a limited portion of the available gray shades are used in the image. FIG. 5 is a histogram 35 of a dim image. Note that the image is composed of only the low numbered gray shades. FIG. 6 is a histogram 36 of a bright image. Note that the image is composed of only the high, numbered gray shades. The dim image and the bright image are similar to the low contrast image in that ail utilize only a small portion of the gray scale range that the display is capable of producing. One consequence of utilizing a limited range of gray shades in an image is that it may not be possible to display brightness subtleties in the image. The result is the visually undesirable effect called contouring.

Some types of video display systems are composed of two elements: a source of illumination and a separate, passive pixilated display. (A passive display is one that modulates rather than emits light.) An example of this type display system is a backlit LCD as is commonly found in direct view LCD television, monitor and laptop computer products, as well as microdisplay (HTPS, LCOS, DLP) based projection televisions. In a conventional implementation of such a display system, tire brightness of the illumination source is held constant and the various gray shades in the image are accomplished through a pixel by pixel modulation by the LCD.

SSBC is a process by which the content of the "captured image" is analyzed in real time and the brightness of the illumination source and the range of gray shades in the image are simultaneously adjusted in real time. For example, the content of an input video image may be analyzed in real time and the brightness of the illumination source and the range of gray shades in the image are simultaneously adjusted in real time in such a way as to increase the inter frame contrast ratio and to better utilize the available shades of gray. One example of the process proceeds as follows:

The input image or the "captured image" is analyzed by creating a histogram to determine the number of pixels at each gray scale level for a frame of video. An algorithm can be used to characterize the distribution of pixels and gray levels into several classes. For example, the range of pixel gray shade distribution and the average image brightness can be calculated and used in a control algorithm. Various algorithms have been developed and used for this purpose, e.g., by respective television manufacturers that include SSBC features in their televisions, and other algorithms may be developed in the future for these purposes.

The histogram distribution of the input image or "captured image" or the gray scale range can be stretched such that the displayed image utilizes more of the available gray levels. The stretching can he accomplished, for example, by application of a non-linear gamma function or gamma type of function. Techniques for adjusting gamma in display systems are blown. The actual non-linear gamma function or a function similar to the type of function that is used to apply a gamma characteristic or a gamma adjustment in a display may depend on the characteristics of the display and may be written accordingly by a person who has ordinary skill in the art. Not only can the histogram distribution or the gray scale range be stretched, but other algorithms can interpolate and insert additional gray levels into the stretched image. The additional gray levels tend to reduce contouring.

A synchronous adjustment is made to the illumination source to compensate for the brightness change that occurs because of the histogram stretching. For example, the appropriate light intensity may be provided the passive display to obtain the desired brightness of the output image that is viewed or projected.

The result of the SSBC adjustments is the production of the "SSBC sourced, processed and encoded image" that is to be sent to the display.

As an example of this process, an illustration of the histogram 37 of a SSBC adjusted dim video image is presented in FIG. 7. For example, in the dim image illustration of FIG. 5 the shades of gray used in the image are in Range 1, which extends from about a shade 7 to about a shade 49. To do an SSBC adjustment of the dim video image to stretch, to expand or to increase the number of shades of gray, or to maintain the same number of shades of gray but to have them extend over a wider range of shades than those of the illustrated dim image, as is illustrated in FIG. 7, the shades of gray now extend over Range 2, e.g., from about shade 5 to about shade 250.

After SSBC adjustment, a wide portion of the available gray shades can be displayed under all video image conditions. The resulting image that may be visible on the display can be called "displayed image".

In FIG. 8 a flow chart 38 outlining the process by which SSBC is typically applied to a video signal is illustrated. At the head end 40 (where content generation and recording occur) the image is analyzed and the proper SSBC calculations are performed and encoded into the video signal. Image capture, editing, recording and compression and encoding steps are shown in the block 40, for example. The steps at block 40 may be carried out in the image source portion 13 (FIG. 1). The video signal, with encoded SSBC information, is then stored or is transmitted as shown at block 41, e.g., via various broadcasting, satellite, internet, etc. transmission and/or via various storage means such as, tor example, CD, DVD, Blu-Ray, HD DVD, etc. Finally, at the receiving end 42, the video image with SSBC is implemented and the images are displayed. The steps at block 42, decoding of metadata, SSBC processing of video signal, SSBC adjustment of illumination and display may be carried out at the output portion 14 (FIG. 1), for example.

In prior display systems that used SSBC technique, SSBC analysis and calculation have been performed at the location of the display and can be called the in-display approach or in-display system. This approach necessitates that all of the digital control circuitry cost be incurred in each and every display. In addition, it leaves the nature of the SSBC adjustment in the hands of the display designer and not the content creator, that is, in a sense in the hands of engineers and not artists.

The present invention may be used to help provide for the SSBC calculations to be accomplished fully and properly for many different video display systems. In the present invention the SSBC calculations and implementation and decisions pertaining to them may be provided from both image creators and video engineers, for example, such video engineers who design displays.

In prior in-display SSBC systems the procedure for determining the proper adjustment to the image brightness and the gray levels, sometimes referred to as proper SSBC calculation, various manufacturers, organizations and individuals have developed, means of image analysis with the result that many different algorithms have been developed. The various approaches for in-display SSBC use different methods and have improved the image quality to differing extents, e.g., not the same for different displays, etc.

There is a burden or cost associated with in-display SSBC adjustments because the video signal is analyzed and the SSBC calculation is accomplished at the receiving end. That is, by circuitry co-located at or even within the video display. This approach means that appropriate circuitry for input image analysis and application of algorithms needs to be included along with or in every video display system. The expense of implementing SSBC is fully incurred in each and every individual video display system unit.

In accordance with an aspect of the invention, the video image may be processed at its source and the incoming video signal is encoded with the information on the proper SSBC implementation. These aspects of the invention tend to reduce the need for circuitry in each individual video display to perform (at least) the SSBC calculations. As is described further herein, the SSBC process may he accomplished in a way such that the "modified" video signal, e.g., modified according to SSBC to achieve SSBC image quality or enhancements, can still be properly displayed on a conventional (e.g., non SSBC enabled) video display.

According to an aspect of the invention, as is described herein, the proper SSBC calculation is generated, and information specifying the proper SSBC implementation is generated at the head end of the system, e.g., the image source portion 13 (FIG. 1), thus removing the need for calculation circuitry at each and every receiver. These aspects may be accomplished in such a way that the resulting modified video image can be properly displayed on conventional (non SSBC enabled) displays. One exemplary approach to accomplish these aspects is to base the SSBC adjustment on a visual "area of interest" within the image, as is described elsewhere herein.

SSBC can be applied and the benefits of SSBC accomplished in direct view and projection type LCD displays, The reason is that, in these type display systems, the illumination source and the passive, pixilated display are separate entities.

On the average, the field of view of each individual human eye in the horizontal plane is about 150° (150 degrees) (e.g., about 60° to nose, and about 90° to side). The vertical field of view is about 120° (e.g., about 60° up, and about 60° down). Note, however, that within the field of view, the attention of the human eye/brain system will, at any time, focus on a much smaller area, called the area of interest. This is usually the case even when the viewer is looking at a video display. That is, within the display, regardless of its size, the human eye/brain will focus on a sub area of an image, regardless of the size of the image. The size and location of the sub area can change with time but, none-the-less, the primary, most detailed information that the viewer perceives of the image usually is from the area of interest. That is, the viewer's impression of overall image quality is determined by the quality of the image within the area of interest.

According to an embodiment of the invention, in order to provide the viewer a high quality image, the quality of the image within the area of interest is optimized or at least is improved, for example, using SSBC methods. The adjustment or quality of the image outside the area of interest is less important to the viewer's determination of image quality than that of the image quality within the area of interest.

There are a variety of definitions commonly used for the term metadata. Several simple definitions are as follows:

Metadata is data about data.

Metadata is information about data.

Metadata is information about information.

An example of metadata and of its use and value is as follows: "12345" is data which, without additional context, is meaningless. When additional information is provided (metadata) such as "this number is a ZIP code" (postal code), one can understand that "12345" refers to the General Electric plant in Schenectady, N.Y.

A more sophisticated definition of metadata is:

Metadata is optional, structured, encoded data that are publicly available and that describe characteristics of information bearing entities to aid in the identification, discovery, assessment and management of the described entities.

Metadata is utilized in video technology. To elaborate on the role of metadata in video, consider MPEG-7, an ISO standard developed by the Moving Picture Experts Group. MPEG-7 can be described as the multimedia standard for the fixed and mobile web enabling integration of multiple paradigms. An alternative and somewhat supplementary description is that MPEG-7 is a standard for describing the multimedia content data that supports some degree of interpretation of the information, meaning, which can be passed on to, or accessed by, a device or a computer code.

Further details on how metadata is embodied in the MPEG-7 standard are as follows: MPEG-7 Includes Visual Description Tools that consist of basic structures and Descriptors. They cover the following basic visual features: color, texture, shape, motion, localization and face recognition. MPEG-7 Multimedia Description Schemes (DSs) are metadata structures for describing and annotating audio visual (AV) content. The DSs provide a standardized way of describing in XML (a general, purpose markup language that supports a wide variety of applications) the important concepts related to AV content description and content management in order to facilitate searching, indexing, filtering and access. The DSs are defined using the MPEG-7 Description Definition Language and are instantiated as documents or streams. The resulting descriptions can be expressed in a textual form (e.g., human readable for editing, searching, filtering) or compressed binary form (e.g., for storage or transmission).

The MPEG-7 Descriptors are designed primarily to describe low level audio or visual features such as color, texture, motion, audio energy and so forth, as well as attributes of AV content such as location, time, quality and so forth. It is expected that most Descriptors for low level features shall be extracted automatically in applications.

On the other hand, the MPEG-7 DSs are designed primarily to describe higher level AV features such as regions, segments, objects, events; and other immutable metadata related to creation and production, usage and so forth. The DSs produce more complex descriptions by integrating together multiple Descriptors and DSs, and by declaring relationships among the description components. In MPEG-7, the DSs are categorized as pertaining to the multimedia, audio or visual domain. Typically, the multimedia DSs describe content, consisting of a combination of audio, visual data and possibly textual data, whereas, the audio or visual DSs refer specifically to features unique to the audio or visual domain, respectively.

To restate these comments on metadata in less technical terms and to focus them on video: metadata is additional information that is transmitted along with a video signal. The data occupies otherwise unused "space" in the video signal. Tins additional information can be ignored by the receiving system with no effect on the image. On the other hand, if the receiving system is properly enabled, the metadata can be interpreted and so provide further information about the image. In principle, this additional information can he used at the location of the display to adjust the qualities of the video image.

An image acquisition and display system, tor example, as is illustrated at 12 in FIG. 2, may be used to carry out the following process or method:

At the source, e.g., the image source portion 13, define a visual area of interest 11 in each and every video frame 10. The source can be the point of image creation, image editing, image recording or image transmission, for example.

At the source, circuitry, e.g., computer 16 and associated peripherals and software, calculates the adjustments to the backlight brightness and the image pixel data including gray levels required to optimize image quality within the area of interest. As is described herein, to optimize image quality means at least to improve the image quality, for example by using the SSBC approach described herein, e.g., to increase or to stretch the number of gray levels at which linage data is shown by the display and to make corresponding adjustment of the illumination level (brightness or intensity) of the light source that illuminates the passive display.

At the source, encode this information as metadata.

Record (CD, DVD or store for internet distribution), e.g., at 51 (FIG. 2) or transmit, e.g., as is shown at 52, the metadata along with the video signal. The video signal and metadata may be provided at the output 53 of the image source portion 13, for example.

At the display 54, circuitry decodes the backlight brightness and the pixel information including the gray levels instructed by the metadata.

At the display, circuitry, which receives transmitted signals from 52 or signals from a CD/DVD/tape or other medium player 55, adjusts the backlight 56 brightness and the LCD gray levels, e.g., to be portrayed by the passive display 57, as instructed.

Consider what is accomplished by utilizing the disclosed procedure:

Since it is performed at and by the source 13, the SSBC calculation can be optimized by the image creator, editor, encoder or broadcaster such that the displayed image by 14 will have the intended appearance.

Note that SSBC adjustments made at the source 13 can be chosen to be consistent with the artistic intentions of the image creator.

Because the system 12 optimizes or at least improves the image quality within the area of interest 11, the viewer perceives an overall improvement in image quality. Optimizing or improving image quality may include, for example, expanding or stretching gray scale, enhancing contrast and/or brightness of the image, enhancing detail provided in and/or seen in the image, setting maximum and/or minimum levels (e.g., brightness, contrast, etc. of the image), providing contrast weighting, etc.

Since functions described above are done at the source 13, the burden of SSBC calculation is incurred just once. This removes the need for calculation circuitry at every receiver thus reducing overall system cost.

Note that display systems that are not SSBC enabled will ignore the metadata. The image displayed on such systems will be unaffected by the presence of the metadata.

Different levels of metadata instructions can be encoded to improve the displayed image on a wide range of displays, from high definition TVs to mobile cell phone displays.

As is illustrated in FIG. 9, another embodiment of the invention has the metadata contain information related to characteristics of the area of interest including, for example, its contrast, brightness, colors and the like. Such "characteristics metadata" may be provided by the source portion 13. In FIG. 9 the characteristics metadata is provided at 16a from the source portion 13 (FIG. 2); the video signal with the characteristics metadata is shown at block 53', which is provided as an input to the output portion 14 of the system 12a. The output portion 14 includes a player, e.g., CD, DVD, Tape, Blu-Ray, etc., or display 55', light source(s) 56 and a passive display 57. The player or display system 55' is associated with the light source(s) and display and includes a computer 60 and memory 61 to compute the appropriate light intensity for illuminating the display and revised, e.g., stretched, shades of gray at the output portion 14, thereby to provide an image that is adjusted according to the area of interest information received at 16a. in this embodiment, the SSBC enabled receiver 14 would still have the capability to calculate the required adjustments to the brightness of the backlight 56 and the gray shades for the passive display 57. Advantages of this embodiment include the ability of each individual model and make of receiver to implement adjustments appropriate to its unique display characteristics. Gamma adjustments are made in respective displays whereby the gamma characteristic of the display is taken into consideration as incoming signals are processed and shown on a display; and the present invention may similarly take into account the unique characteristics of a display as an SSBC or like method is implemented based on received metadata and/or based on area of interest data. Thus, this embodiment still assures that the corrections are properly identified and optimally implemented. This embodiment may not lead to such reduction in cost as may be achieved in the embodiment of FIG. 1, for example, because of the need to maintain the ability to calculate the changes at each receiver; but the time to make the calculations may be reduced because the image characteristics are provided by the source 13 and/or because in some instances the calculations may only have to be carried out for the area of interest 11 that is smaller than the entire image 10.

In FIG. 10 another embodiment of the invention illustrated includes the SSBC calculation capability in an advanced video player such as a DVD, Blu-ray or HD DVD player. The video signal may be recorded at recorder 51 may include image characteristics metadata, e.g., of an area of interest, which is shown at block 53'. In this embodiment, the video player 55" would not only play the DVD, etc., but would perform the SSBC image analysis and add appropriate metadata to the video stream. The SSBC enabled display would properly decode the metadata information and present an enhanced image.

Several additional embodiments of the invention are described below.

In an embodiment an example of metadata encoding includes providing full instructions; in a sense the display is a "dumb" display in that it does not have to do any calculations. Full instructions are provided to the dumb display. In this embodiment, the SSBC calculations are performed at the head end 13 (FIG. 1) or 40 (FIG. 8). The calculations can be based on an image area of interest 11 or some other criteria. The calculations can utilize input from people or be accomplished automatically by a software algorithm. The video stream along with the metadata are stored or transmitted. Upon receipt at the display end 14, the instructions are directly implemented without further processing or interpretation. This can be thought of as a SSBC enabled "dumb" display.

Several advantages of this approach include:
Reducing the cost of the hardware and software at the display end.
"Getting it right" since the encoding is done at the content source by the image creators.

The invention may be used with a display that is responsive to SSBC profile information or with displays that are not able to respond to SSBC profile information. Therefore, using the present invention, even if the area of interest and/or SSBC profile information are provided the display as metadata at an unused portion of a video signal data stream, such metadata will not affect performance of the display. Thus, in this sense, the invention is backwards compatible being useful with display systems capable to make adjustments in the image characteristics or image signal based on area of interest image characteristics or SSBC profile arid with display systems that are not so capable; in the latter case the area of interest and/or SSBC information may be ignored by the display or will not be seen or considered by the display.

In another embodiment instructions are provided in a look up table in the display. The look up table may be specific to a display model. In this embodiment, the SSBC calculations are performed at the head end 13 or 40. The calculations can be based on an image area of interest 11 or some other criteria. The calculations can utilize input from people or be accomplished automatically by a software algorithm. The video stream along with the metadata are stored and transmitted. Upon receipt at the display end 14, the required adjustments are referred to a look up table unique to the display make and model. In this way the SSBC adjustments that are implemented at the display and the displayed image, including the light source intensity and the passive display gray levels are adjusted based on values in the "look up" table or found in the look up table to tend to enhance or to optimize the image for the display make and model.

Several advantages of this approach include:
The same system of encoding applies across the entire spectrum of display ends 14 (also referred to above as output portion or receiving device).
The system is "hierarchical. That is, some sophisticated display ends may use the entire range of look up table information encoded in the metadata but other, less complex display ends may use only a sub set.

In another embodiment metadata is calculated by a smart display. In this embodiment the definition of an area of interest 11 or some other criteria are stored or transmitted as metadata along with the video stream. Upon receipt at the display end 14, the SSBC adjustments are calculated by a software algorithm in the media processor (in the case of a television, for example) or in the module controller (in the case of a LCD, for example). The SSBC adjustments are then implemented on the display either directly or, through a look up table, in a manner unique to the specific make and model of the display.

Regarding location for generating metadata, in various embodiments in which the SSBC calculation is performed at the display end 14 (either based on an area of interest 11 or some other criteria) the function can be performed in a number of device types, e.g., at a player or other device that provides images to the display. This is useful because of the large body of "legacy" video (video not originally created with SSBC included) that will need to be processed before being displayed on an SSBC enabled display. Examples of devices in which the SSBC calculation and the encoding function can be performed include the following:
DVD player
Blue-Ray player
HDDVD player
A computer
A cable or satellite box
A digital tuner of set top box
Video game consol It is noted that the size of the area of interest 11 is flexible. In the extreme case, it occupies the entire image and thus reduces to the most elementary procedure used for SSBC adjustment calculation.

Also, it will be appreciated that the features of the invention described herein apply to still images as well as to multiple images, e.g., movies, videos, etc.

Metadata reduces calculation time and lag at the display end 14. Consider, for example, a case in which the image pixel count is high and the algorithm for calculation of SSBC adjustment is complex. If the SSBC calculations were implemented at the display end 14 it is conceivable that the ability of the display system to process the image may not he able to keep up with the demands of the video rate. In such a case, visual artifacts may be introduced into the image. This points to a potential advantage of the metadata approach. Since the calculation is performed at the head end 14 or 40 and transmitted along with the video signal, the burden of calculation is removed from the display end 14. In this way, the ability of the system 12, for example, to display SSBC enabled video at full video rate is assured.

There are several different and potentially quite distinct types of video materials available including:
Movies—action, drama, romantic
Sports—indoor, outdoor Video games Animation Broadcast TV—talk shows, sitcoms An example of a method and system used in embodiments of the invention to enhance the ability of the invention to properly display these different types of video materials having alternate SSBC look up tables. The table that is selected is determined by user choice or a content creator specification that is included in the metadata.

Although the invention is described generally without specific reference to color displays and video signals representing color images, black and white displays and video signals representing black and white images, or other specific type of displays or video signal, it will be appreciated that the features of the invention may be used with color displays, black and white displays, and/or other types of displays and with various types of signals, e.g., video signals, MPEG format signals, etc.

It will be apparent to a person having ordinary skill in the art of computer programming, and specifically in application programming for display systems and/or other electrical and/or electronic devices would be able to prepare appropriate computer program software or code to operate and carry out the various features and logical functions described herein, e.g., for use in the computer 16 and other parts of the system described herein. Accordingly, details as to specific programming code have been left out for the sake of brevity.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

It will be appreciated that portions of the present invention can be implemented in hardware, software, firmware, or a combination thereof. In the described embodiments), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discreet logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The logic and/or steps represented in the flow diagrams of the drawings, which, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element mid a claim, whereas, any elements that do not. specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of preparing an image signal for display, comprising:
   a computing device in an image source, which is separated from a display, defining an area of interest in an image, wherein the area of interest is less than the entire image;
   the computing device in the image source using gray level and brightness information pertaining to the area of interest to calculate and determine a control profile of the image, wherein the control profile of the image identifies a range of gray levels and a brightness for the area of interest;
   the computing device in the image source encodes the control profile of the image pertaining to the area of interest in metadata, the encoded control profile includes information for stretching the identified range of gray levels in the area of interest and illumination brightness adjustment information for the area of interest; and
   the computing device in the image source providing the encoded control profile in a video signal stream to simultaneously adjust backlight brightness and the range of gray levels of LCD pixels of the entire image in real time based on the encoded content of the control profile,
   wherein the control profile of the image is ignored by a display device not enabled to simultaneously adjust backlight brightness and adjust gray levels of the LCD pixels in real time based on the content of the image input.

2. The method of claim 1, said defining comprising defining the area of interest at an image receiver.

3. The method of claim 1, said defining comprising defining the area of interest at a camera that generates the image.

4. The method of claim 1, said defining comprising defining the area of interest while editing the image.

5. The method of claim 1, said defining comprising defining the area of interest at an image player.

6. The method of claim 1, said defining comprising defining the area of interest at a video recorder.

7. The method of claim 1, wherein said defining is carried out by a person selecting the area of interest.

8. The method of claim 1, wherein said defining is carried out automatically using an algorithm.

9. The method of claim 1, said stretching comprising interpolating.

10. The method of claim 1, said providing the control profile comprising providing the metadata in unused space of the video signal stream.

11. The method of claim 1, said providing the control profile comprising providing area of interest information in the video signal stream separate from video imagery in the video signal stream.

12. The method of claim 1, wherein the control profile is prepared where the image is obtained.

13. The method of claim 1, wherein the control profile is prepared where the image is prepared.

14. An Apparatus separated from a display for preparing an image for display on the display, comprising:
   a processor adapted to compute a control profile for the image based on gray level and brightness information pertaining to an area of interest, wherein the area of interest is less than the entire image,
   wherein the control profile identifies a range of gray levels and a brightness for the area of interest, said processor being adapted to combine the control profile as encoded information for stretching the identified range of gray levels in the area of interest and an illumination brightness adjustment information for the area of interest in the image signal for transmission to the display,
   wherein said control profile includes information for simultaneously adjusting backlight brightness and the range of gray levels of LCD pixels of the entire image in real time based on the encoded content of the image, wherein the control profile of the image is ignored by a display device not enabled to simultaneously adjust backlight brightness and adjust gray levels of the LCD pixels in real time based on the content of the image input.

* * * * *

UNITED STATES PATENT AND TRADEMARK OFFICE
CERTIFICATE OF CORRECTION

PATENT NO.         : 9,443,479 B2                        Page 1 of 1
APPLICATION NO.    : 14/621482
DATED              : September 13, 2016
INVENTOR(S)        : James L. Fergason et al.

It is certified that error appears in the above-identified patent and that said Letters Patent is hereby corrected as shown below:

On the Title Page

Item (63) Related U.S. Application Data:

Change:
"Continuation of application No. 12/525,098, filed as application No. PCT/US2008/052521 on Jan. 30, 2008, now Pat. No. 8,982,146."

To:
--Continuation of application No. 12/525,098, filed on May 21, 2010, now Pat. No. 8,982,146, which is a National Stage Entry of PCT/US2008/052521 filed on Jan. 30, 2008.--

Signed and Sealed this
Twenty-first Day of March, 2017

Michelle K. Lee
*Director of the United States Patent and Trademark Office*